US012732819B2

(12) United States Patent
Pathania

(10) Patent No.: US 12,732,819 B2
(45) Date of Patent: Sep. 8, 2026

(54) DETECTING CELL SITE SIMULATOR

(71) Applicant: Boost SubscriberCo L.L.C., Englewood, CO (US)

(72) Inventor: Amit Pathania, Great Falls, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 145 days.

(21) Appl. No.: 18/523,640

(22) Filed: Nov. 29, 2023

(65) Prior Publication Data

US 2025/0119748 A1 Apr. 10, 2025

Related U.S. Application Data

(60) Provisional application No. 63/588,927, filed on Oct. 9, 2023.

(51) Int. Cl.
*H04L 29/06* (2006.01)
*H04W 12/122* (2021.01)

(52) U.S. Cl.
CPC .................................. *H04W 12/122* (2021.01)

(58) Field of Classification Search
CPC . G06F 12/1408; H04L 9/3239; H04W 12/122
See application file for complete search history.

(56) References Cited

U.S. PATENT DOCUMENTS 10,225,255 B1 * 3/2019 Jampani .............. H04L 63/1416
2016/0212623 A1 * 7/2016 Cote .................. H04W 12/122
2020/0225358 A1 * 7/2020 Kaabouch ............. G06N 20/00

* cited by examiner

*Primary Examiner* — Wasika Nipa
(74) *Attorney, Agent, or Firm* — Kilpatrick Townsend & Stockton LLP

(57) ABSTRACT

Devices, systems, and methods for detecting cell site simulators are provided. An example method includes obtaining signal characteristics data including geolocation data, identifying a legitimate cell site in proximity to the geolocation of the user device based on the geolocation data, identifying a preestablished model stored in the user device, and the model is corresponding to the identified legitimate cell site and includes one or more predetermined expected features. The method further includes selecting the identified model, extracting one or more actual features from the signal characteristics data using the selected model, comparing the actual features with the predetermined expected features to determine a degree of matching of the actual features with the predetermined expected features, and in response to a determination that the degree of matching is below a predetermined threshold, indicating that the cell site is a suspicious cell site simulator.

16 Claims, 9 Drawing Sheets

DETECTING CELL SITE SIMULATOR

CROSS REFERENCE TO RELATED APPLICATIONS

This application claims priority to U.S. Provisional Patent Application No. 63/588,927, filed on Oct. 9, 2023, the disclosure of which is incorporated by reference in its entirety for all purposes.

BACKGROUND

Illegitimate cell sites/towers/radio stations are also known as cell site simulators, stingrays, dirt boxes, rogue towers, or IMSI (International Mobile Subscriber Identity) catchers in the field of telecommunication. Illegitimate cell site simulators are typically designed to mimic legitimate ones, tricking nearby mobile phones into connecting to them. Once a mobile device is connected to a cell site simulator, the cell site simulator may intercept and collect a wide range of sensitive data, including call metadata, text messages, voice and video data, and the location of the mobile device. Additionally, cell site simulators can potentially disrupt legitimate mobile communication networks, leading to service interruptions and security vulnerabilities.

Detecting and identifying cell site simulators is a challenging task. These rogue towers may leave behind few traces, making it difficult to differentiate from legitimate cell towers. One current approach for detection of rogue towers involves the use of hardware detection devices such as RF (radio frequency) monitoring equipment, which can be used to identify unusual or unauthorized signals in the cellular network. However, this approach has limitations and deficiencies, such as the need for specialized and often expensive equipment, inherent inaccuracies in detection, and the inability to locate the precise location of the rogue towers. Additionally, as technology continues to evolve, it may render existing hardware-based detection methods less effective to detect rogue towers.

SUMMARY

In accordance with some embodiments of the present disclosure, a method is provided. In one example, the method includes: obtaining signal characteristics data in a user device. The signal characteristics data is associated with signals transmitted between the user device and a cell site connected to the user device within a time period and comprises geolocation data indicating a geolocation of the user device within the time period. The method further includes identifying, by the user device, a legitimate cell site in proximity to the geolocation of the user device, based on the geolocation data. The method further includes identifying, by the user device, a preestablished model stored in the user device, and the model is corresponding to the identified legitimate cell site and comprises one or more predetermined expected features extracted from historical signal characteristics data associated with signals transmitted between the user device and the identified legitimate cell site. The method further includes selecting the identified model, extracting one or more actual features from the signal characteristics data using the selected model, comparing the actual features with the predetermined expected features to determine a degree of matching of the actual features with the predetermined expected features, and in response to a determination that the degree of matching is below a predetermined threshold, indicating that the cell site is a suspicious cell site.

In accordance with some embodiments of the present disclosure, a device for detecting a cell site simulator is provided. In one example, the device includes one or more processors and a computer-readable storage media storing computer-executable instructions. The computer-executable instructions, when executed by the one or more processors, cause the device to obtain signal characteristics data. The signal characteristics data is associated with signals transmitted between a user device and a cell site connected to the user device within a time period and comprising geolocation data indicating a geolocation of the user device within the time period. The instructions, when executed by the one or more processors, further cause the device to identify a legitimate cell site in proximity to the geolocation of the user device based on the geolocation data and identify a preestablished model stored in the user device. The model is corresponding to the identified legitimate cell site and comprises one or more predetermined expected features extracted from historical signal characteristics data associated with signals transmitted between the user device and the legitimate cell site. The instructions, when executed by the one or more processors, further cause the device to select the identified model, extract one or more actual features from the signal characteristics data using the selected model, compare the actual features with the predetermined expected features to determine a degree of matching of the actual features with the predetermined expected features, and in response to a determination that the degree of matching is below a predetermined threshold, indicate that the cell site is a suspicious cell site.

In accordance with some embodiments, the present disclosure also provides a non-transitory machine-readable storage medium encoded with instructions, the instructions executable to cause one or more electronic processors of a device or a system to perform any one of the methods described in the present disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
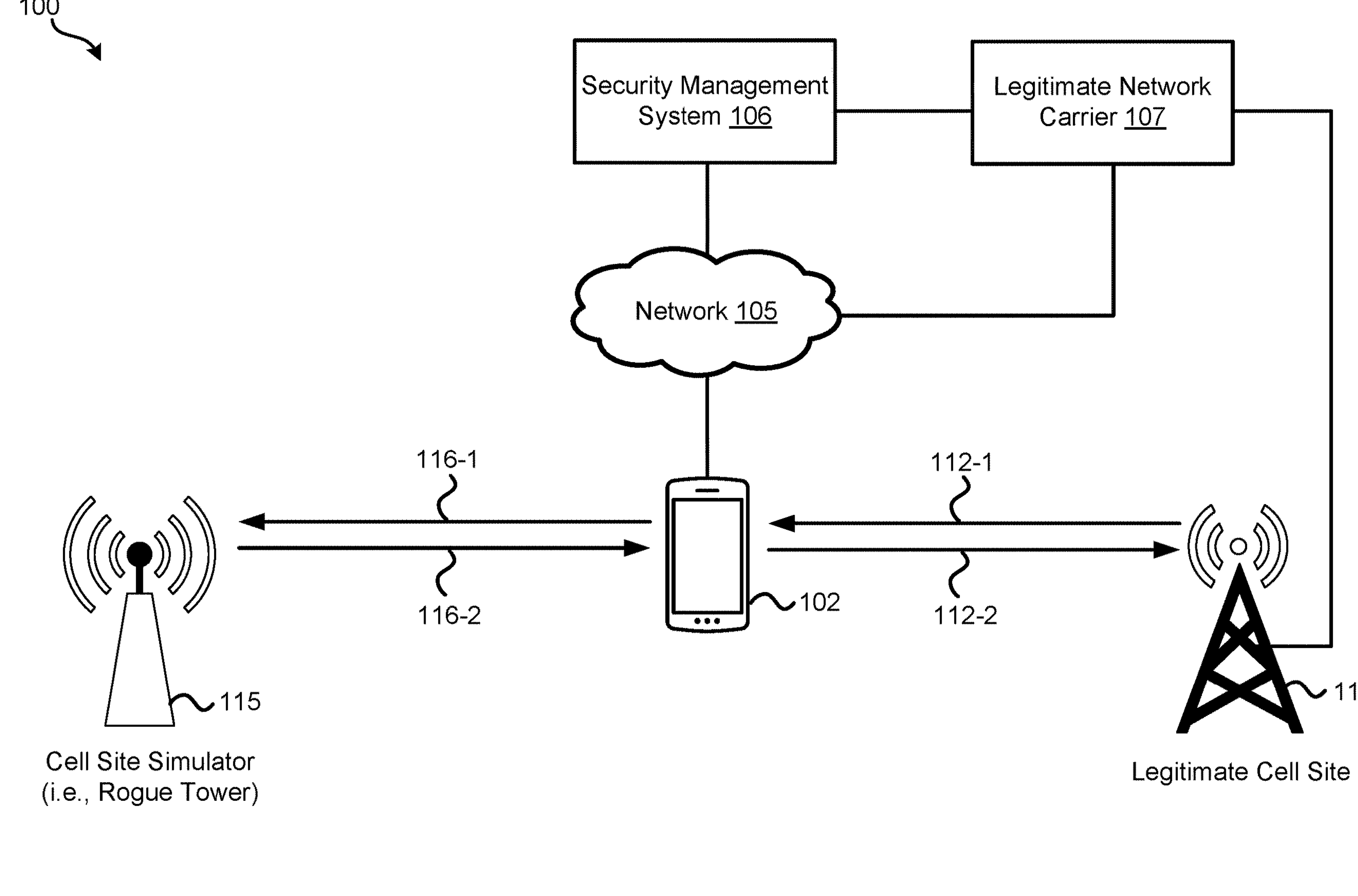
FIG. 1 is a schematic diagram illustrating an example of a communications system according to various embodiments.

The present disclosure provides methods, devices, systems, and software products generally related to detecting cell site simulators.

As mentioned above, a cell site simulator can be a sophisticated terminal device that can effectively mimic a legitimate cell site within a legitimate cellular network. The cell site simulator can manipulate several critical parameters to appear genuine. For example, the cell site simulator can clone the cell ID of a nearby legitimate cell site, making it virtually indistinguishable in terms of cell site identification. Furthermore, cell site simulators can emit signals on the similar frequency or frequency bands used by the legitimate cell sites to mislead the user devices. This masquerade presents a significant challenge for user devices attempting to identify these rogue cell site simulators. Commonly used identification mechanisms, such as cell ID and frequency, do not suffice to expose them, as they appear virtually identical to legitimate cell sites.

The present disclosure provides more advanced identification mechanisms to unmask cell site simulators. According to some embodiments, an example method relies on analyzing a significantly broader set of signal characteristics beyond cell ID and frequency. These characteristics may encompass parameters like signal strength, signal-to-noise ratio (S/N ratio), and interference levels, among various other signal quality metrics.

The present method can leverage historical signal characteristics data obtained from signal transmissions between user devices and known legitimate cell sites to construct a model aimed at distinguishing legitimate from suspicious cell sites. The model generation process includes the analysis of extensive historical signal characteristics data, extracting relevant features or patterns, and generating feature vectors therefrom. These feature vectors represent the unique characteristics of signal transmissions associated with legitimate cell sites. Different models may be developed for various legitimate cell sites in different geographic areas to achieve adaptability to diverse network scenarios.

When a user device connects to an uncertain cell site, the user device may utilize the proximity of the uncertain cell site to the location of the user device to identify the appropriate model for analysis. The user device can employ the selected model to analyze the signal characteristics data collected from the connection between the user device and the uncertain cell site and extract actual features or attributes therefrom. Comparison of the actual signal characteristics data and features against the expected features specified by the model can allow the user device to determine whether the signal characteristics fall within a predetermined acceptable range associated with legitimate cell sites.

The model-based approach according to the present disclosure provides a robust and dynamic method for identifying suspicious cell sites by extensively evaluating their broad signal characteristics against established patterns associated with the known legitimate cell site. The models can continuously learn and update the detection criteria based on new signal characteristics data to continuously improve the effectiveness over time. Further, the present method may not require specialized hardware installations and thus can be more cost-effective and scalable for widespread deployment in cellular networks.

FIG. 1 is a schematic diagram illustrating an example of a communications system 100 (hereinafter "system 100") according to various embodiments. In the illustrated example, system 100 includes, among other components, a user device 102, a communications network 105, a security management system 106, a legitimate cell site 110, and a cell site simulator 115.

The user device 102 may be an electronic device used by an end-user, a client, or a customer. The user device 102 may be a wireless mobile device, a smartphone, a tablet, a personal computer, a smartwatch, a media streaming device, among others.

A "legitimate cell site" used herein, also known as a "legitimate cellular base station" or "authorized cell tower," or other equivalents, is referred to a telecommunications infrastructure component that is part of a licensed and approved cellular network operated by a legitimate cellular network provider 107 (or a legitimate cellular network carrier 107). A legitimate cell site is established and maintained in compliance with the regulatory and licensing requirements of the region or country in which it operates.

A "cell site simulator" used herein, also referred to as a "stingray," "dirtbox," or "rogue tower," is a covert electronic surveillance device designed to illegitimately mimic a legitimate cellular site to deceive nearby user devices and other wireless devices into connecting to it as if it were a genuine cell site operated by a legitimate and authorized mobile network carrier. The cell site simulator 115 is not operated by the legitimate cellular network provider 107.

The user device 102 can be connected to and communicate with the legitimate cell site 110. Once connected, the user device 102 can receive radio frequency signals (hereinafter "signals") through downlink signal transmission 112-1 and transmit signals through uplink signal transmission 112-2. The downlink signal transmission 112-1 and uplink signal transmission 112-2 are collectively referred to as signal transmission 112.

Similarly, the user device 102 can be connected to and communicate with the cell site simulator 115. Once connected, the user device 102 can receive signals through downlink signal transmission 116-1 and transmit signals through uplink signal transmission 116-2. The downlink signal transmission 116-1 and uplink signal transmission 116-2 are collectively referred to as signal transmission 116.

The security management system 106 may be operated by the legitimate network carrier 107 to monitor and manage the legitimate cell site 110. The security management system 106 may be operable to generate a model for detecting a cell site simulator and send the model to the user device 102. The user device 102 may use the model to determine whether a cell site to which the user device 102 is connected is a cell site simulator. The user device 102 may be in communication with the security management system 106 through the communications network 105. The communications network 105 may be a wireless cellular network provided and operated by the legitimate network carrier 107. Details of the components of system 100 will be described below with reference to FIGS. 2A-2B.

Figure 2A:
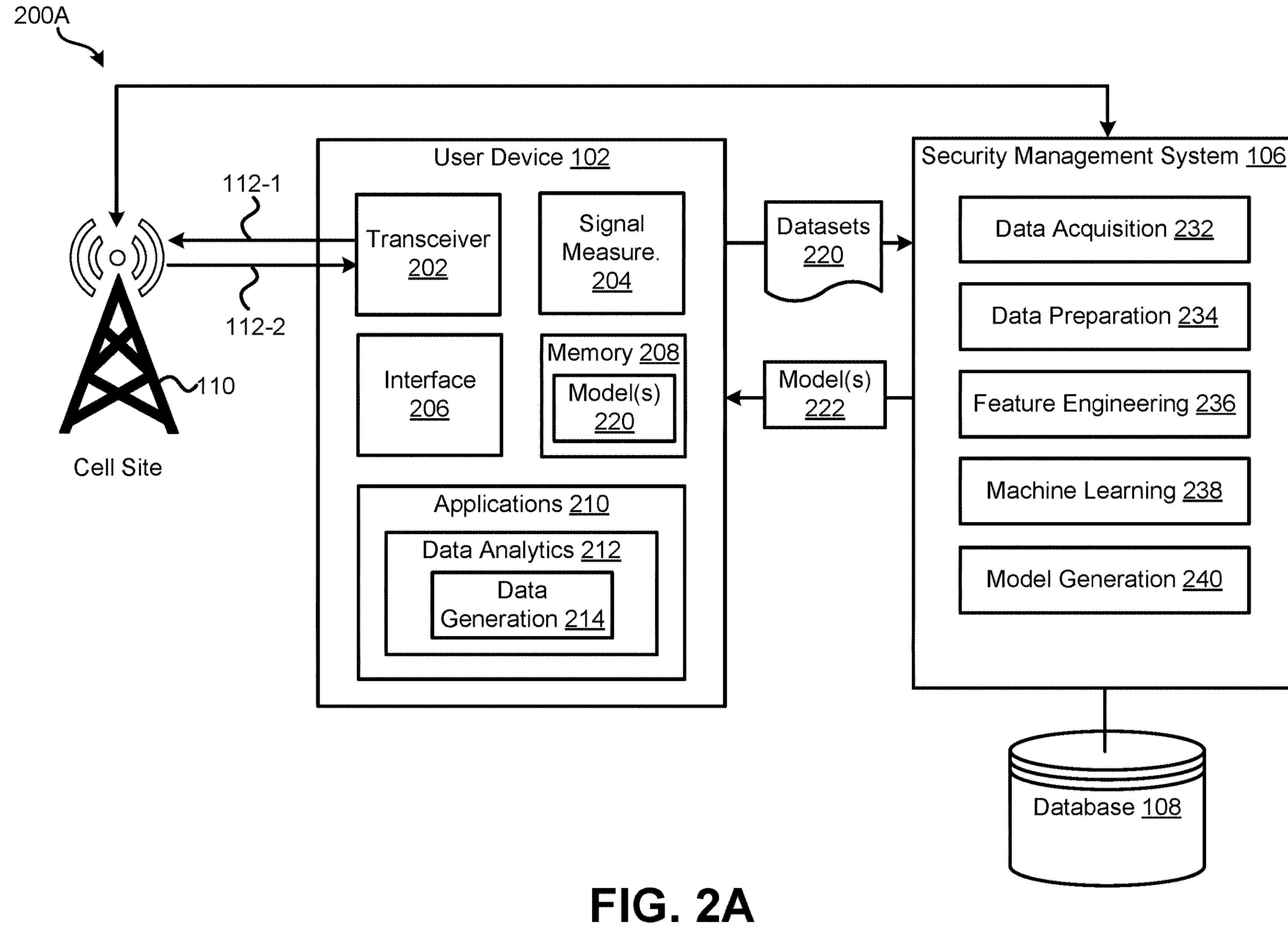
FIG. 2A is a schematic diagram illustrating another example of a communications system according to various embodiments.

FIG. 2A is a schematic diagram illustrating another example of a communications system 200A (hereinafter "system 200A") according to various embodiments. System 200A includes, among other components, a user device 102, a security management system 106, a database 108 in connection with the security management system 106, and a legitimate cell site 110. Various components of the components of system 200A may be either a hardware entity, a software module, or a hybrid amalgamation of both. It should be noted that, in certain implementations, the components of the user device 102 and the security management system 106 may manifest as specialized software executed on versatile general-purpose hardware. Furthermore, to cater to specific functional requirements, the security management system 106 may be implemented within a cloud infrastructure. For instance, the security management system 106 could operate as a cloud-based service.

The user device 102 further includes a receiver 202-1 and a transmitter 202-2 (collectively as transceiver 202), a signal measurement component 204, interface 206, memory 208, and one or more applications 210. The applications 210 may further include a data analytics application 212. The data analytics application 212 further includes a signal characteristics data generation module 214.

Receiver 202-1 is responsible for capturing and processing incoming wireless signals from cell sites such as the legitimate cell site 110 (e.g., through downlink transmission 112-1) or the cell site simulator 115 (through downlink transmission 116-1). Receiver 202-1 is operable within specific frequency bands allocated for cellular communication. For example, in 4G LTE or 5G networks, receiver 202-1 may cover multiple frequency bands (i.e., downlink band), including the frequency bands in the sub-6 GHz and millimeter-wave (mmWave) ranges. Receiver 202-1 may be connected to an antenna or antenna array (not shown) that captures electromagnetic waves carrying the signals. Once signals are captured by the antenna, receiver 202-1 processes the received signals through several stages, including amplification, filtering, and demodulation to extract the digital information (e.g., data packets) embedded in the received signals.

Transmitter 202-2 is responsible for transmitting signals back to the legitimate cell site 110 (e.g., through uplink transmission 112-2) or the cell site simulator 115 (e.g., through uplink transmission 116-2). Transmitter 202-2 may send signals, such as data, voice calls, and control messages, to the cell site. Transmitter 202-2 can modulate digital information into analog signal that can be transmitted through the antenna. Similar to receiver 202-1, transmitter is operable within specified frequency bands (i.e., uplink band) allocated for cellular communication.

The signal measurement component 204 is responsible for measuring the signals transmitted between the user device 102 and a cell site 110 or cell site simulator 115 to which the user device 102 is connected. The signal measurement component 204 may be an integrated system (e.g., a system-on-chip) or otherwise a combination of separate hardware components (e.g., receiver, spectrum analyzer, signal strength indicator, signal quality monitor, satellite signal receiver such as GPS (global positioning system) receiver, accelerometer, antenna switch, signal analyzer, etc.) included in the user device 102. The signal measurement component 204 can measure the signal characteristics and quality metrics of the signals transmitted from the user device 102 and received by the cell site 110 connected to the user device 102 (denoted as "uplink signal characteristics data"), as well as the signal characteristics and quality metrics of the signals sent from the cell site 110 connected to the user device 102 and received by the user device 102 (denoted as "downlink signal characteristics data"). The uplink signal characteristics data and downlink signal characteristics data may also be collectively referred to as signal characteristics data.

Example of the signal characteristics data includes but is not limited to cell site identifier (ID), timestamp data (e.g., time when the signal is transmitted and received), signal information block (SIB) data (i.e., broadcasted data structure transmitted from the cell site and containing essential information about configuration, capabilities, and services of the cellular network provided by the legitimate carrier), signal strength data (e.g., measured in decibels relative to milliwatts (dBm)), signal-to-noise ratio data (e.g., measured in decibels (dB)), signal frequency data (e.g., measured in Hertz (Hz)), error rates data (bit error rate and/or packet error rate), signal bandwidth data (i.e., the width of the frequency spectrum occupied by the signal in a specific period of time), signal latency data, carrier-to-interference ratio data, geolocation data (e.g., GPS coordinates or other location information related to the user device when the signal is transmitted or received), antenna configuration data (e.g., antenna gain, polarization, and diversity), channel condition data, transmission power data, signal duration data. Each signal characteristics data may include a data point labeled with the timestamp indicating the time point when the specific measurement or observation of the signal characteristics data was generated. In some embodiments, the data point may be further labeled with a signal type (i.e., downlink signal or uplink signal) of the signal characteristics data. In some embodiments, the downlink signal characteristics data point and uplink signal characteristics data point may be different when associated with the same timestamp.

The interface 206 is responsible for facilitating communication with the user and external components of the system 100 to enable data exchange and control. The interface 206 may include a user interface and a communication engine. The user interface is responsible for facilitating interactions between the user and the device regarding signal characteristic data, for example, displaying signal-related information to the user, enabling users to view historical data, or initiating specific actions related to signal characteristics, such as toggling data collection on/off, providing visual or auditory alerts to inform users about changes in network conditions, signal characteristics, and/or the detection of suspicious signal characteristics, and allowing the user to provide feedback or report issues related to signal characteristics.

The communication engine is responsible for the bidirectional flow of data between the user device 102 and the security management system 106. The communication engine allows the user device 102 to transmit signal characteristic data (e.g., datasets 220), such as measurements related to signal characteristics and quality metrics, to the security management system 106. The communication engine may also be responsible for receiving models 222 and updates on the models 222 from the security management system 106. The models 222 can be used by the user device 102 for detecting cell site simulators.

Application 210 may include a data analytics application 212, which may further include a data generation module 214 responsible for generating signal characteristics data. The data generation module 214 can collect data points from various hardware components within the user device 102, such as the transceiver 202, signal measurement component

204, and other components. The data generation module 214 can aggregate/compile the collected data points, such as signal strength, signal quality metrics, interference ratios, and SIB data, into a cohesive signal characteristics dataset (i.e., dataset 220) that represents the signal characteristics of the signal transmitted between the user device 102 and a cell site (e.g., the cell site 110 or the cell site simulator 115) to which the user device 102 is connected. The data generation module 214 can assign the cell site ID, signal type (downlink signal or uplink signal), as well as timestamp to each dataset 220. The application 210 may include additional components, which will be described below with reference to FIG. 2B.

The security management system 106 is generally responsible for managing the legitimate cell site 110 and facilitating the detection of cell site simulators for the protection of the user device 102. As mentioned above, the security management system 106 may be operated by the legitimate cellular network carrier 107.

In some embodiments, the security management system 106 may be implemented as an application in radio intelligent control (RIC) of the legitimate cellular network carrier 107. The security management system 106 may operate in close proximity to the radio access resources of the cellular network to enable monitoring and controlling network activities in real-time. RIC is responsible for management and control of network resources. Integration of the security management system 106 as an application to RIC can facilitate detection of anomalies, unauthorized access, or unusual signal patterns and allowing for immediate responses.

In some embodiments, the security management system 106 may be implemented as an application within the Radio Access Network (RAN) provided by the legitimate network carrier. The security management system 106 may coordinate with RAN components and provide localized monitoring and control over cell site security. In some embodiments, the security management system 106 may be deployed in a centralized server of the legitimate network carrier 107 for centralized control and analysis of signal characteristic data from multiple cell sites. In some embodiments, the security management system 106 may be deployed in a cloud to enable remote management and serve multiple regions or cell sites from a centralized cloud infrastructure.

As shown in FIG. 2A, the security management system 106 further includes a data acquisition module 232, a data preparation module 234, a feature engineering module 236, a machine learning (ML) module 238, and a model generation module 240. The data acquisition module 232 is responsible for collecting signal characteristic data and/or datasets 220 sent from the user device 102. The data preparation module 234 is responsible for processing the collected signal characteristic data and/or datasets 220. In some embodiments, the signal characteristic data generated by the user device 102 may be processed by the security management system 106, and the dataset 220 may be generated in the security management system 106. For example, the security management system 106 may monitor the signal transmitted from and/or received by the cell site 110 through signal transmission 112. The signal characteristics data may be further processed by the data preparation module 234 to generate datasets, in a similar manner as the data generation module 214 included in the user device 102.

The feature engineering module 236 is responsible for extracting signal pattern features based on the signal characteristics datasets associated with the signals transmitted between the user device 102 and the legitimate cell site 110. The feature engineering module 236 takes the raw signal characteristic data collected from the signal transmission between the user device 102 and the legitimate cell site 110. The feature engineering module 236 may further employ various algorithms to identify and extract relevant features or patterns within the signal characteristic data, normalize the extracted features and generates feature vectors (also referred to as "data descriptor") based on the normalized features, generate signal characteristics clusters (also referred to as "pattern groups"), and predict/determine an acceptable range of signal characteristics (also referred to as "acceptable bounds," "thresholds," or "normal behavior limits.") The model generation module 240 is responsible for generating and validating one or more models 222. The model 222 may include the determined acceptable range, and the algorithms used for feature engineering by the feature engineering module 236, as well as other algorithms for determining whether a provided dataset associated with a cell site falls within the acceptable range. In some embodiments, the model 222 includes one or more machine learning (ML) models. The ML module 238 is responsible to generate and train the ML models and implement the ML models in the model generated by the feature engineering module 236. In some embodiments, the ML module 238 and the feature engineering module 236 may operate collaboratively or in a conjunctive manner to generate the model 222 used for detecting cell site simulators. More examples of the process for generating the model 222 will be described below with reference to FIG. 4.

The database(s) 108 is in connection with security management system 106 and may include various data sources provided by third party or public, such as geolocation data, crime statistics data, and law enforcement data. For example, the geolocation data may include geolocation of cell sites, user devices, or potential anomalies, which can be used for spatial analysis and geofencing. The data stored in the database 108 may be retrieved by the security management system 106 and used to develop and/or validate the model 222.

It should be noted that the feature engineering module 236 can generate device-specific models for each user device, based on the historical signal characteristics data between the user device with a known legitimate cell site. The device-specific models can enhance anomaly detection and provide more accurate results tailored to the behavior of individual user devices.

The feature engineering module 236 may also have the capability to generate distinct device-specific models, each corresponding to various legitimate cell sites situated in different geographic regions. These device-specific models are inherently unique, reflecting the specific characteristics of each legitimate cell site. When the user device 102 connects to an unfamiliar or uncertain cell site, a proximity-based approach may be employed by the user device 102 to intelligently identify and select the most appropriate model from memory 208 for the detection and determination of the anomaly.

Figure 2B:
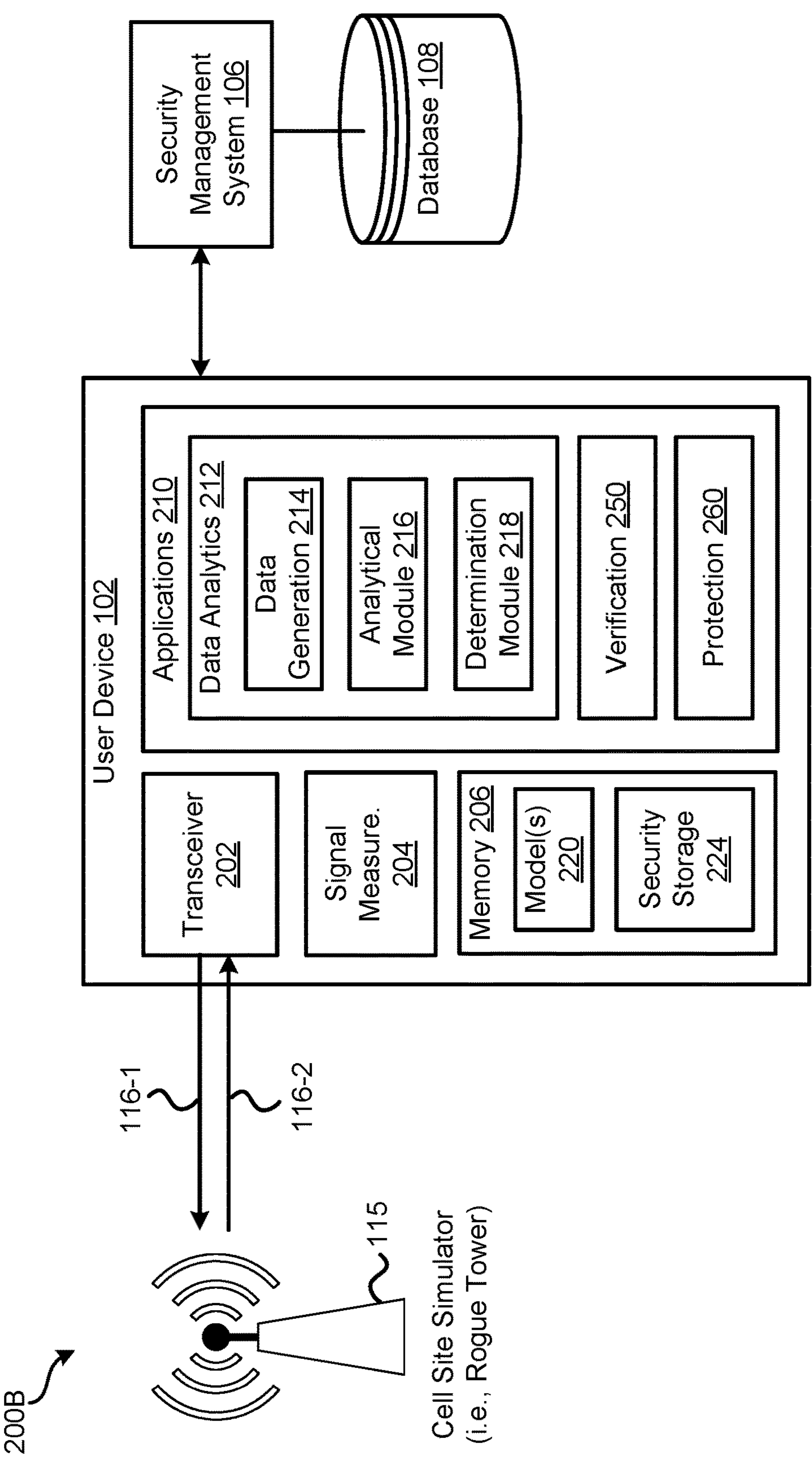
FIG. 2B is a schematic diagram illustrating another example of a communications system according to various embodiments.

FIG. 2B is a schematic diagram illustrating another example of a communications system 200B (hereinafter "system 200B") according to various embodiments. System 200B includes, among other components, a user device 102 as illustrated in FIG. 2A, a security management system 106, a database 108 in connection with the security management system 106, and a cell site simulator 115. The user device 102 further includes a security storage 224 in memory 208. The user device 102 further includes an analytical module 216 and a determination module 218 in the data analytics application 212. The user device 102 further includes a verification application 250 and a protection application 260.

When the user device 102 is connected to a cell site simulator 115, the data generation module 214 may be operable to generate signal characteristics data and datasets of the signals from signal transmissions 116-1 and 116-2. The analytical module 216 is operable to identify and select a model 222 from memory 208, employ the model and various algorithms included therein to analyze the signal characteristics data and datasets, extract one or more actual features from the signal characteristics data and dataset, generate one or more actual signal characteristics clusters based on the signal characteristics data and dataset. The determination module 218 is operable to determine whether the actual features extracted from the signal characteristics data and dataset match the predetermined expected features provided by the model. The determination module 218 is operable to determine whether the actual signal characteristics clusters fall within the predetermined acceptable range specified by the model 222. Based on the outcome of comparison of the actual features against the expected features and the determination of the actual clusters against the acceptable range, the determination module 218 can further determine whether the cell site is a suspicious cell site (e.g., a cell site simulator). For example, if the signal characteristics cluster determined by the model 222 is outside the boundary of the acceptable range, a suspicious cell site simulator is indicated.

The verification application 250 is responsible for confirm the legitimacy of the suspicious cell site. In some embodiments, when a suspicious cell site is detected based on anomalies in signal characteristics, the verification application 250 may be triggered. In some embodiments, the verification application 250 may send a challenge question to the suspicious cell site, requesting a response. If no response is received from the suspicious cell site within a predetermined time frame, the suspicious cell site is verified as a cell site simulator. If a response is received from the suspicious cell site and includes an answer provided by the cell site simulator, the provided answer is compared to a preestablished answer stored in the security storage 224. If the provided answer matches the preestablished answer, the suspicious cell site is verified as legitimate. In the absence of a match, the suspicious cell site is verified as a cell site simulator.

It should be noted that the challenge-response mechanism is an example for illustrative purposes only, and other types of verification mechanisms may also be possible in other embodiments. For example, a public-private key pair may be employed to verify the legitimacy of the suspicious cell site. The user device 102 and the legitimate cell site 110 may share a public-private key pair. The legitimate cell site 110 may sign its communications with the private key, and the user device 102 may use the public key to verify the signature. If the communication from the suspicious cell site cannot be verified with the legitimate private key, it can be verified as illegitimate.

The protection application 260 is responsible for protecting the user device 102 from potential threats posed by cell site simulators. In some embodiments, the protection application 260 may employ an exploitative mechanism. For example, when the suspicious cell site is detected, the protection application 260 may be triggered or activated. The protection application 260 initiates an immediate disconnection of the user device 102 from the cell site simulator 115. The action severs the communication link between the device and the potentially harmful cell site simulator. Simultaneously, the protection application 260 ceases data transmission between the user device 102 and the cell site simulator 115 for a specific duration, such that no sensitive or private data is inadvertently transmitted to the cell site simulator. No further action is taken. Depending on the implementation, the user may be notified of the detected anomaly, threat of the cell site simulator, and the protective actions taken.

In some embodiments, the protection application 260 may employ an explorative mechanism. The explorative mechanism is similar to the exploitative mechanism but includes the verification mechanism described above. For example, once a disconnection of the user device 102 from the suspicious cell site is initiated, the protection application 260 may operate to activate the verification application 250 to verify the legitimacy of the suspicious cell site. As mentioned above, the verification application may send challenge questions or requests to the suspicious cell site simulator, seeking specific responses or information that only a legitimate cell site would possess. The verification application 250 analyzes the responses received from the cell site simulator and checks whether the responses match the preestablished expected answers or patterns predefined for legitimate cell sites.

In some embodiments, the user device 102 may send the signal characteristics data and datasets of the signals communicated between the user device 102 and the cell site simulator 115 to the security management system 106. The signal characteristics data associated with the cell site simulator can be used to further refine/verify/update the models 222. The security management system 106 may send the refined/updated models back to the user device 120.

Figure 3:
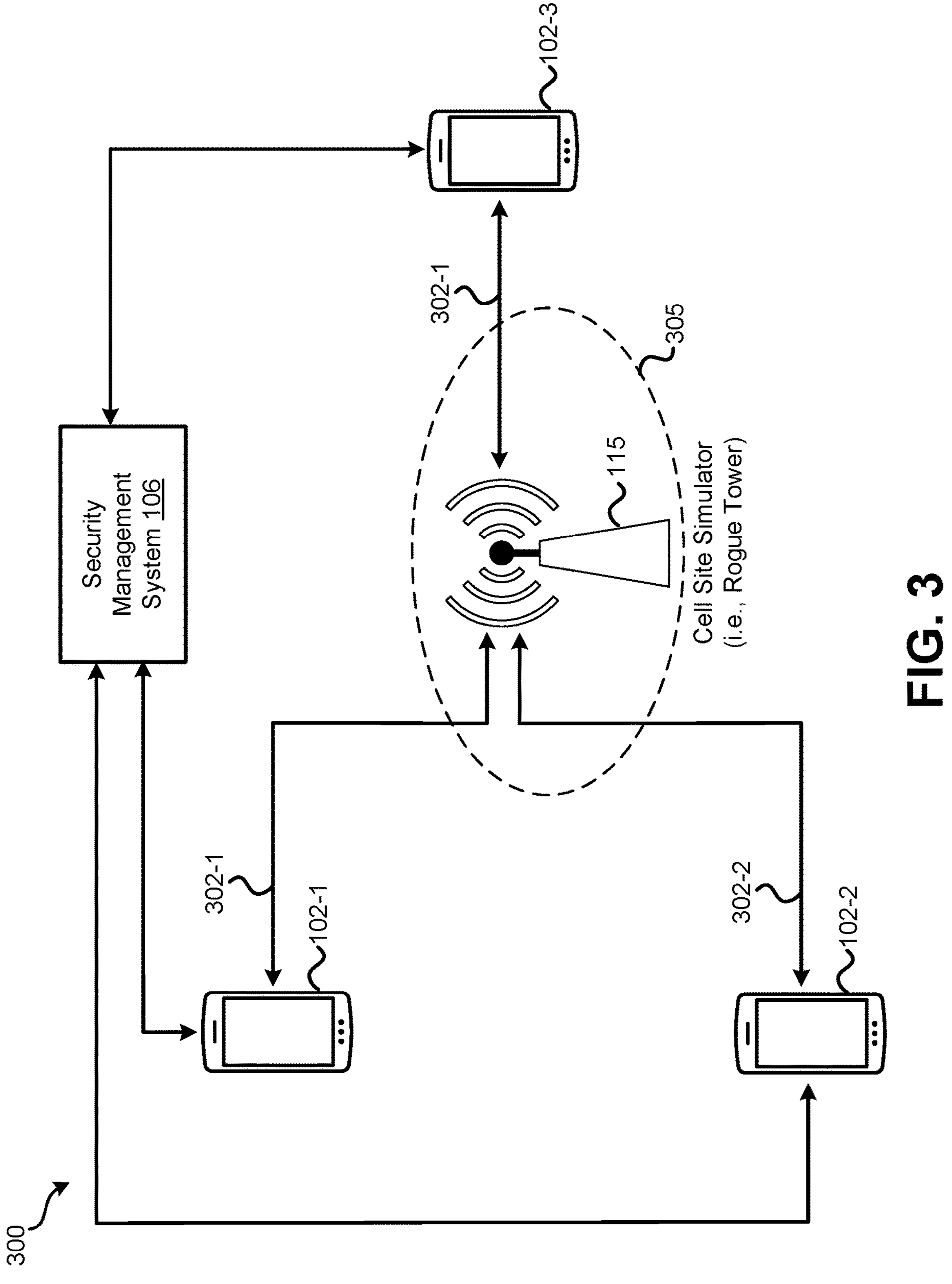
FIG. 3 is a schematic diagram illustrating another example of a communications system according to various embodiments.

FIG. 3 is a schematic diagram illustrating another example of a communications system 300 (hereinafter "system 300") according to various embodiments. In the illustrated example, system 300 includes, among other components, multiple user device 102 (e.g., a first user device 102-1, a second user device 102-2, a third user device 102-3, etc.), a cell site simulator 115, and a security management system 106. The multiple user devices 102 may be connected to and in communication with the cell site simulator 115 at about the same time or within a same time window. For example, the first user device 102-1, the second user device 102-2, and the third user device 102-3 may respectively communicate signals with the cell site simulator 115 through data transmissions 302-1, 302-2, and 302-3. The security management system 106 may communicate with the user devices 102-1, 102-2, and 102-3 to respectively receive signal characteristics data therefrom.

System 300 may operate to identify the geographic area 305 where the cell site simulator 115 is located, based on the simultaneous or substantially simultaneous identification of the cell site simulator 115 by multiple user devices 102 connected to the cell site simulator 115. In some embodiments, a positioning technique such as bilateral (e.g., in need of at least two user devices 102) or triangulation (e.g., in need of at least three user devices 102) may be employed. For example, each of the multiple user devices 102 (e.g., user device 102-1, user device 102-2, and user device 102-3) collects signal characteristics data during their interactions with the cell site simulator 115 within the same time window. The signal characteristics data includes the geolocation data of each user device 102, as well as other data such as signal strength data, and other signal quality data. Each user device 102 calculates the angles between itself and the cell site simulator 115, based on the collected signal characteristics data. In some embodiments, angle calculation may involve using trigonometry and converting signal strength data or other signal quality data into relative position of the user device 102 from the cell site simulator. Each user device 102 may share the calculated angles and associated timestamps with the security management system 106 or another central processing entity such as a triangulation server operated by the legitimate network carrier 107. The security management system 106 may receive position data (e.g., angle data) from multiple user devices 102 and performs triangulation calculations. In some embodiments, the security management system 106 compares angles measured by different user devices 102 and identifies an intersection point where lines of sight (LOS) from the user devices 102 converge. The intersection point may represent the estimated location of the cell site simulator 115. It should be noted that other variations of the triangulation mechanisms may also be employed in other embodiments or without restriction.

It should be noted that the triangulation method used to locate the cell site simulator 115 described above is only one example for illustrative purposes. Other positioning techniques may also be employed in other embodiments. In some embodiments, the signal characteristics data from each user device 102 may be timely transmitted to the security management system 106 once the cell site simulator 115 is verified by the user device 102, and the security management system 106 may calculate and determine the location of the cell site simulator 115 before the cell site simulator 115 moves away from the location.

Figure 4:
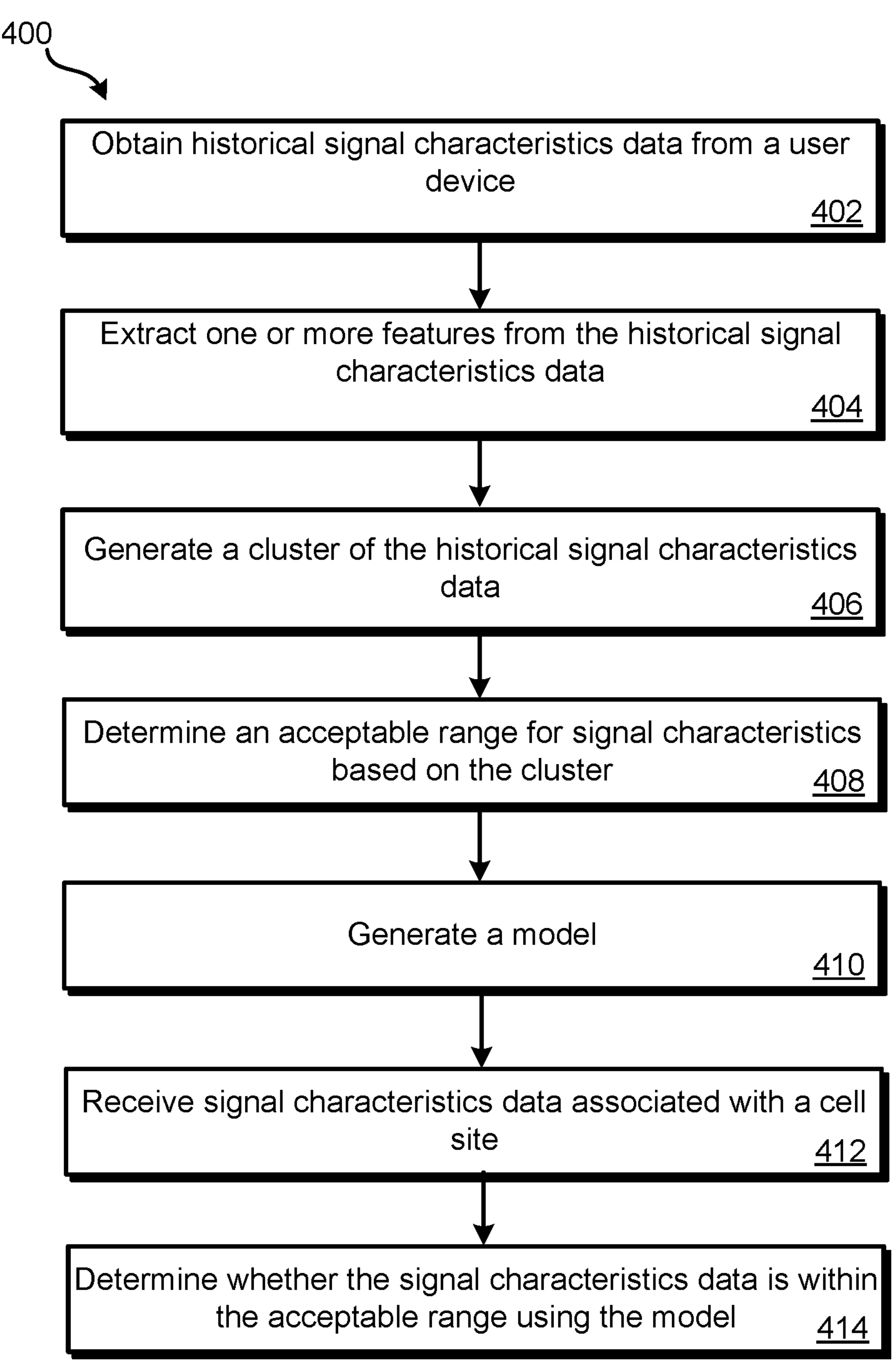
FIG. 4 is a flow diagram illustrating an example process for generating a model according to various embodiments.

FIG. 4 is a flow diagram illustrating an example process 400 for generating a model 222 of FIGS. 2A-2B according to various embodiments. Depending on the implementation, process 400 may include additional, fewer, or alternative steps/operations performed in various orders or in parallel. Process 400 or any steps/operations thereof may be combined with other methods or processes described herein in any suitable manner. As mentioned above, the model 222 can be used to detect an anomaly of signal characteristics and identify a cell site simulator.

At 402, historical signal characteristics data is obtained from a user device and stored in a server of a security management system. This historical data is collected from the user device when it communicates with a known legitimate cell site. This legitimate cell site may be a part of the cellular network operated by the legitimate cellular network carrier to which the user device is subscribed. The historical signal characteristics data represents past interactions and signal transmission between the user device and the legitimate cell site. The historical signal characteristics data represents past interactions and signal transmission between the user device and a known cell site simulator. The historical signal characteristics may include various signal parameters and characteristics during these interactions and data transmission. This historical signal characteristics data may serve as a reference for establishing normal signal patterns, determining expected features and signal characteristics associated with the legitimate cell site, and constructing/developing a model for detecting suspicious cell site, and/or verifying legitimacy of the suspicious cell site. The historical signal characteristics data may be labeled with a cell site ID of the legitimate cell site, a signal type such as uplink signal or down link signal, and a timestamp. In some embodiments, historical signal characteristics data representing the signal transmission of the user device and each one of multiple legitimate cell sites may be received in or obtained by the security management system 106.

At 404, the historical signal characteristics data is processed/analyzed to extract one or more features. These features represent attributes or patterns of the signal historical data that further represent typical/normal signal behavior associated with the legitimate cell site. The extracted features can be used for detecting anomalies or deviations from normal signal patterns. For example, the historical signal characteristics data may include signal strength data, and a first feature can be extracted from the signal strength data. The first feature quantifies the degree of variability or fluctuations in the received signal strength data over time in a specified time window/frame. The first feature measures how stable or consistent the signal strength is during communication with the legitimate cell site and can be calculated as the standard deviation of signal strength values over the specified time window. As another example, the historical signal characteristics data may include S/N ratio data, and a second feature can be extracted from the S/N ratio data. The second feature measures the stability of the S/N ratio over time during communication with the legitimate cell site in the specified time window and calculates how consistent the S/N ratio remains within the time window, similar to the first feature.

In some embodiments, a third feature taking into account the correlation between the signal strength and the S/N ratio can be extracted. The third feature measures the degree of correlation between the signal strength and the S/N ratio over time during communication with the legitimate cell site in the specified time window. The third feature may calculate a correlation coefficient (e.g., a ratio of signal strength to the S/N ratio) that indicates whether changes in signal strength are associated with corresponding changes in the S/N ratio over time in the specified time window. In normal scenarios, a relatively stable and consistent relationship between signal strength and S/N ratio is observed. For instance, as a user device moves away from a cell site, both signal strength and S/N ratio tend to decrease together. A substantial deviation (i.e., a deviation that exceeds a predetermined threshold) from this expected correlation might be indicative of abnormal behavior and raise suspicion of a cell site simulator. In some embodiments, the extracted feature may be a multi-dimensional representation of multiple signal characteristics, such as the correlation among frequency, signal strength, and S/N ratio in a specific time window. The multi-dimensional feature can capture more nuanced patterns and relationships in the data with higher resolution, which may potentially improve the effectiveness of the model in identifying anomalies.

In some embodiments, the extracted features may be normalized to obtain feature vectors. For example, a correlation feature is extracted from historical signal characteristics data associated with signal transmission between signal strength and S/N ratio for signal transmission between a user device and a legitimate cell site during a specified time window. The correlation feature is standardized using a predetermined algorithm to obtain a feature vector having a mean of 0 and a standard deviation of 1, such that the correlation feature vector is on a standardized scale.

At 406, clusters of the signal characteristics data based on the feature vectors are generated. In some embodiments, one or more extracted features or feature vectors are selected. A clustering algorithm is identified, selected, and applied to the selected features or feature vectors, and the clustering algorithm is used to group signal characteristics data points into clusters based on the similarities of their represented multi-dimensional feature vectors. In some embodiments, the clusters can be visualized in scatter plots where each point represents a signal characteristic data points. Each data point can be labeled with indicator to indicate which cluster each point belongs to. The cluster characteristics can be analyzed when the clusters are formed.

At 408, an acceptable range for signal characteristics is generated based on the clusters and the associated extracted features. In some embodiments, the acceptable range may be determined based on cluster statistics, including the mean, standard deviation, minimum, and maximum values for each feature within the cluster. In some embodiments, a multi-dimensional acceptable range may be determined when multiple extracted features are associated with the cluster (e.g., signal strength, S/N ratio, frequency). The multi-dimensional acceptable range can be illustrated as a hypercube or an ellipsoid in a multi-dimensional feature space. In some embodiments, the acceptable range may be defined based on percentile. For example, the acceptable range can be defined within the 95th percentile of each feature within the cluster. Depending on the complexity of the network condition and signal characteristics, dynamic acceptable ranges may be generated for different areas, time windows, or network conditions for a particular legitimate cell site. In some embodiments, the model may take into account the influence of network condition and other external factors. The model may be timely updated with new signal characteristics data received from the user device, and the acceptable range can be dynamically adjusted accordingly.

In some embodiments, expected features or patterns of signal characteristics data can be determined during the determination of the acceptable range. The predetermined expected features serve as references against which actual features extracted from incoming signal characteristics data can be compared. If the actual features align with or match the predefined expected features, it is considered consistent with legitimate cell site behavior. One the other hand, any deviations from these expected features (e.g., larger than a threshold level or a predetermined degree of matching) can trigger suspicion.

In some embodiments, multiple acceptable ranges are generated respectively for multiple clusters. Each cluster may represent different features or different combinations of features. For example, a first cluster represents the frequency of the downlink signal, a second cluster represents the signal strength of the downlink signal, a third cluster represents the S/N ratio of the downlink signal. A first acceptable range for the frequency may be defined based on the first cluster, a second acceptable range for the signal strength may be defined based on the second cluster, and a third acceptable range for the S/N ratio may be defined based on the third cluster. A threshold or a set of thresholds may be optimized and established based on all three acceptable range. When the signal characteristics data associated with an unknown or uncertain cell site is analyzed by the model and determined to exceed the threshold, the uncertain cell site is indicated as a cell site simulator.

In some embodiments, the acceptable range may be determined in a multidimensional feature space for signal characteristics. For example, in a multidimensional feature space, each dimension corresponds to one of the extracted features (e.g., a first dimension corresponds to signal strength, a second dimension corresponds to S/N ratio, and a third dimension corresponds to frequency). Accordingly, the acceptable range is determined in a three-dimensional (3D) feature space. The signal characteristics data points may be grouped into clusters within the multidimensional feature space, using clustering algorithms such as k-means or hierarchical clustering. Each cluster may represent a pattern of signal characteristics. Each cluster in the multi-dimensional space may be analyzed to determine a central tendency and spread along each dimension. In some embodiments, the centroid and measures of dispersion (e.g., such as standard deviation) can be calculated/determined for each cluster, along each feature dimension. In some embodiments, the acceptable range within the multidimensional feature space can be determined for each feature or feature vector. For example, a region around the centroid of the cluster may be determined, considering the spread of data points within the cluster. Thresholds or limits for each dimension can be determined as the boundary of the acceptable range, for example, based on statistical consideration as well as other optional considerations such as domain knowledge and security requirement. Signal characteristics data points that fall outside these thresholds are considered suspicious.

In some embodiments, the acceptable range is determined by combining the individual ranges along each dimension in the multidimensional feature space. For example, the acceptable range may be a hyperrectangle, and each side of the hyperrectangle corresponds to the range along one dimension. The boundaries of the hyperrectangle in each dimension will be determined by the acceptable ranges for each individual feature.

At 410, a model is generated. The model includes the algorithms for generating signal characteristics data, predetermined expected features, and the acceptable range. The model can be sent to the user device. An application in the user device can be activated to employ the model to generate signal characteristics data associated with an unknown cell site and evaluated against the acceptable range to determine if the unknown cell site is a cell site simulator. As mentioned above, the model can be user device specific, geolocation-specific, and/or cell site-specific. For example, a user device-specific model may take into account the historical behavior of a specific device, a geolocation-specific model may take into account regional variations of a specific geographic region, and a cell site-specific model may focus on characteristics associated with a specific legitimate cell site.

At 412, actual signal characteristics data associated with a cell site to which the user device is connected to is received in the user device. The actual signal characteristics data may be generated from signal transmission between the cell site and the user device in a specified time window. At 414, a data analytics application in the user device is activated and to employ the model and analyze the actual signal characteristics data using the model and extract actual features therefrom. A determination is made on whether the actual signal characteristics data is within the acceptable range provided by the model. Alternatively, a determination is made on whether the actual features extracted from the actual signal characteristics data matches the predetermined expected features specified by the model. In response to a determination that the actual signal characteristics data is not within the acceptable range and/or in response to a determination that a matching degree of the actual features against the expected features is below a predetermined threshold, an indication is made that the cell site is suspicious.

It should be noted that the process 400 described above is for illustrative purposes only, and other processes may also be employed to construct and use the model 222 for detection of cell site simulators.

Figure 5:
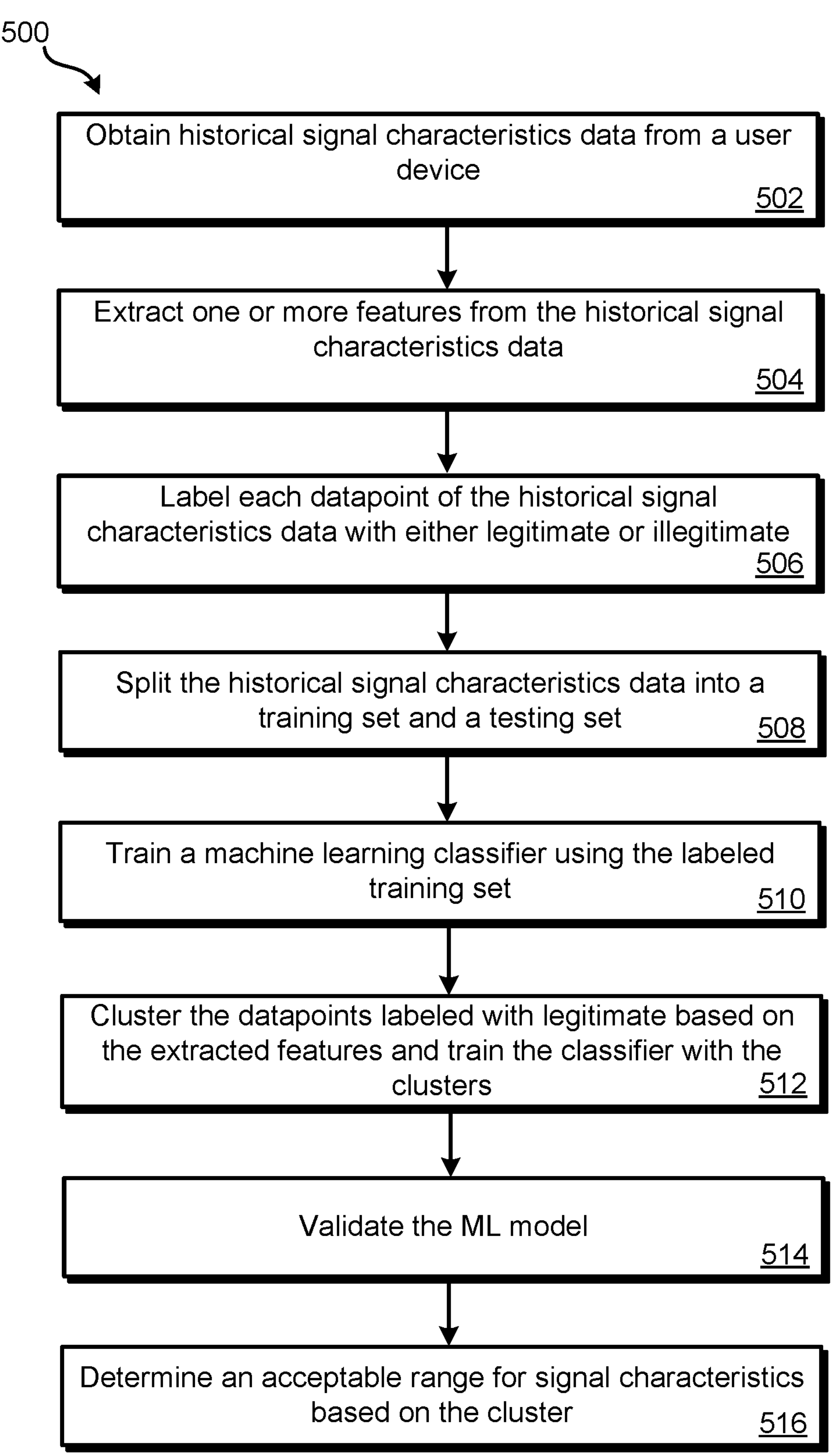
FIG. 5 is a flow diagram illustrating another example process for generating a machine learning (ML) model according to various embodiments.

In some embodiments, the model 222 of FIGS. 2A-2B is a machine learning model. FIG. 5 is a flow diagram illustrating another example process 500 for generating the machine learning model according to various embodiments. Process 500 may be considered as a variation of process 400, and similar operations will not be repeated unless otherwise indicated.

At 502, historical signal characteristics data is obtained from a user device. For example, the historical signal characteristics data may include frequency data, signal strength data, and S/D data associated with signal transmissions between the user device and a cell site to which the user device is connected. The historical signal characteristics data may include signal characteristics data associated with a legitimate cell site as well as the signal characteristics data associated with a cell site simulator.

At 504, one or more features are extracted from the historical signal characteristics data. The features could include statistical measures (e.g., mean, standard deviation) for each signal characteristic (e.g., frequency, signal strength, S/N ratio) over a specified time window. Relationship features may also be extracted based on the correlation between or among the features.

At 506, each one of the data points of the historical signal characteristics data is labeled with either "legitimate" or "suspicious." For example, data points associated with known legitimate cell sites is labeled as "legitimate," while data points associated with suspected cell site simulators are labeled as "suspicious."

At 508, the historical signal characteristics data is split into a training set and a testing set. The training set is used to train the ML model, while the testing set is used to evaluate its performance. The data points in the training set and testing set are labeled with either "legitimate" or "suspicious."

At 510, a machine learning model is constructed and trained with the training set. In some embodiments, a machine learning classifier (e.g., a binary classifier for detecting cell site simulators vs. legitimate cell sites) using the labeled training set. The training set includes feature derived from historical signal characteristic data. Each feature may represent a combination of features extracted from the signal characteristics (e.g., frequency, signal strength, S/N ratio). The ML classifier learns to differentiate between feature associated with legitimate cell sites and the features associated with cell site simulators. A decision boundary can be decided based on the features.

At 512, the data points of the signal characteristics data labeled with "legitimate" are clustered based on the extracted features. In some embodiments, the clusters, which represent groups of "legitimate" signal characteristics, can be used as training labels for the ML classifier. The ML classifier learns from these training labels how to classify incoming signal characteristics data into one of these clusters. A trained ML classifier can be used to evaluate any new, unlabeled signal characteristics data.

At 514, the ML model is validated using the testing set. Various performance metrics may be used to evaluate the performance of the trained ML model on the testing set. Based on the results of the testing set evaluation, adjustments or fine-tuning of the ML model may be performed, including tweaking model parameters, changing feature selection, or employing different algorithms.

At 516, an acceptable range of signal characteristics is generated, after the ML model is trained and/or validated, based on the clusters. The ML model may be sent to the user device for analyzing signal characteristics data associated with a cell site to which the user device is connected and determining whether the cell site is a suspicious cell site.

The machine learning models described above may employ one or more machine learning algorithms such as, but not limited to, a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic or other regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like.

The machine learning models described above may include one or more supervised, unsupervised, or semi-supervised machine learning models. Generally, supervised learning entails the use of the training set of data as discussed herein that may be used to train the machine learning model to apply labels to the input signal characteristics data. For example, the training data may include signal characteristic data containing a plurality of data points (e.g., signal characteristics data) that may be associated with labels indicating whether the cell site is legitimate or illegitimate. Unsupervised techniques, on the other hand, do not require a training set of labels. While a supervised machine learning model may determine whether previously seen patterns in a training dataset have been correctly labeled in a testing dataset, an unsupervised model may instead determine whether there are sudden changes in values of the plurality of data points. Semi-supervised machine learning models take a middle ground approach that uses a greatly reduced set of labeled training data as known in the art.

As discussed herein, the ML model may be trained to classify whether a signal characteristics data is indicative of, for example, the cell site to which the user device is connected to is legitimate or illegitimate. When training the ML classifier, several machine learning algorithms may be evaluated using various statistical techniques such as, for example, accuracy, precision, recall, F1-score, confusion matrix, receiver operating characteristic ("ROC") curve, and/or the like. Training the ML model may also use a Random Forest algorithm, a Gradient Boosting algorithm, an Adaptive Boosting algorithm, K-Nearest Neighbors algorithm, a Naïve Bayes algorithm, a Logistic Regressor Classifier, a Support Vector machine, a combination thereof and/or the like when training the classifier. Gradient Boosting may add predictors to an ensemble classifier (e.g., a combination of two or more machine learning models/classifiers) in sequence to correct each preceding prediction (e.g., by determining residual errors). The K-Nearest Neighbors algorithm may receive each data point within the signal characteristic data and compare each to the "k" closest data points. The AdaBoost Classifier may attempt to correct a preceding classifier's predictions by adjusting associated weights at each iteration. The Support Vector Machine may plot data points within the signal characteristic data in n-dimensional space and identify a best hyperplane that separates the signal characteristics data indicated by the signal characteristic data into two groups (e.g., meeting the signal characteristic threshold (e.g., acceptable range) vs. not meeting the signal characteristic threshold). Logistic Regression may be used to identify an equation that may estimate a probability of, for example, the cell site being a cell site simulator, as a function of a selected feature vector of signal characteristics data. Gaussian Naïve Bayes may be used to determine a boundary between different clusters based on Bayesian conditional probability theorem. A Random Forest Classifier may comprise a collection of decision trees that are generated randomly using random data sampling and random branch splitting (e.g., in every tree in the random forest), and a voting mechanism and/or averaging of outputs from each of the trees may be used to determine whether a signal characteristics data meets or does not meet the signal characteristic threshold (e.g., the acceptable range).

An ensemble classifier (e.g., an ensemble of one or more classifiers) may also be generated by the ML model. Selection of the one or more machine learning models may be based on each respective models' F1-score, precision, recall, accuracy, and/or confusion values (e.g., minimal false positives/negatives). For example, the ensemble classifier may use Random Forest, Gradient Boosting Machine, Adaptive Boosting, Logistic Regression, and Naïve Bayes models. The machine learning model may use a logistic regression algorithm as a meta-classifier. The meta-classifier may use respective predictions of each model of the ensemble classifier as its features to make a separate determination of whether a signal characteristics data meets or does not meet the signal characteristic threshold.

The ensemble classifier may be trained based on the training dataset. For example, the ensemble classifier may be trained to predict results for each of the multiple combinations of signal characteristics data within the training set. The predicted results may include soft predictions, such as one or more predicted results, and a corresponding likelihood of each being correct. For example, a soft prediction may include a value between 0 and 1 that indicates a likelihood of, for example, the cell site to which the user device is connected to being a legitimate cell site, with a value of 1 being a prediction with 100% accuracy, and a value of 0.5 corresponding to a 50% likelihood, and a value of 0 corresponding to a 0% likelihood. Predictions may be made by the ML model based on applying the features to each of the multiple combinations of signal characteristics data within the training set.

The meta-classifier may be trained using the predicted results from the ensemble classifier along with the corresponding combinations of signal characteristics data within the training dataset. For example, the meta-classifier may be provided with each set of the signal characteristics data and the corresponding prediction from the ensemble classifier. The meta-classifier may be trained using the prediction from each classifier that is part of the ensemble classifier along with the corresponding combinations of values.

Performance of the machine learning models may be evaluated in a number of ways based on a number of true positives, false positives, true negatives, and/or false negatives classifications of the plurality of data points indicated by the machine learning model. For example, the false positives of the machine learning model may refer to a number of times the model incorrectly classified the cell site to which the user device connected as a cell site simulator. For example, the false positives of the machine learning model may refer to a number of times the model incorrectly classified one or more signal characteristics data as not meeting or exceeding a signal characteristic threshold. Conversely, the false negatives of the machine learning model may refer to a number of times the machine learning model classified one or more signal characteristics data as meeting or exceeding the signal characteristic threshold when, in fact, the one or more signal characteristics data did not meet or exceed the signal characteristic threshold. True negatives and true positives may refer to a number of times the machine learning model correctly classified the one or more signal characteristics data with respect to meeting, or not meeting, the signal characteristic threshold, respectively. A user may compliment the machine learning by identifying false or true positive as well as false or true negatives. Related to these measurements are the concepts of recall and precision. Generally, recall refers to a ratio of true positives to a sum of true positives and false negatives, which quantifies a sensitivity of the machine learning model. Similarly, precision refers to a ratio of true positives a sum of true and false positives.

Figure 6A:
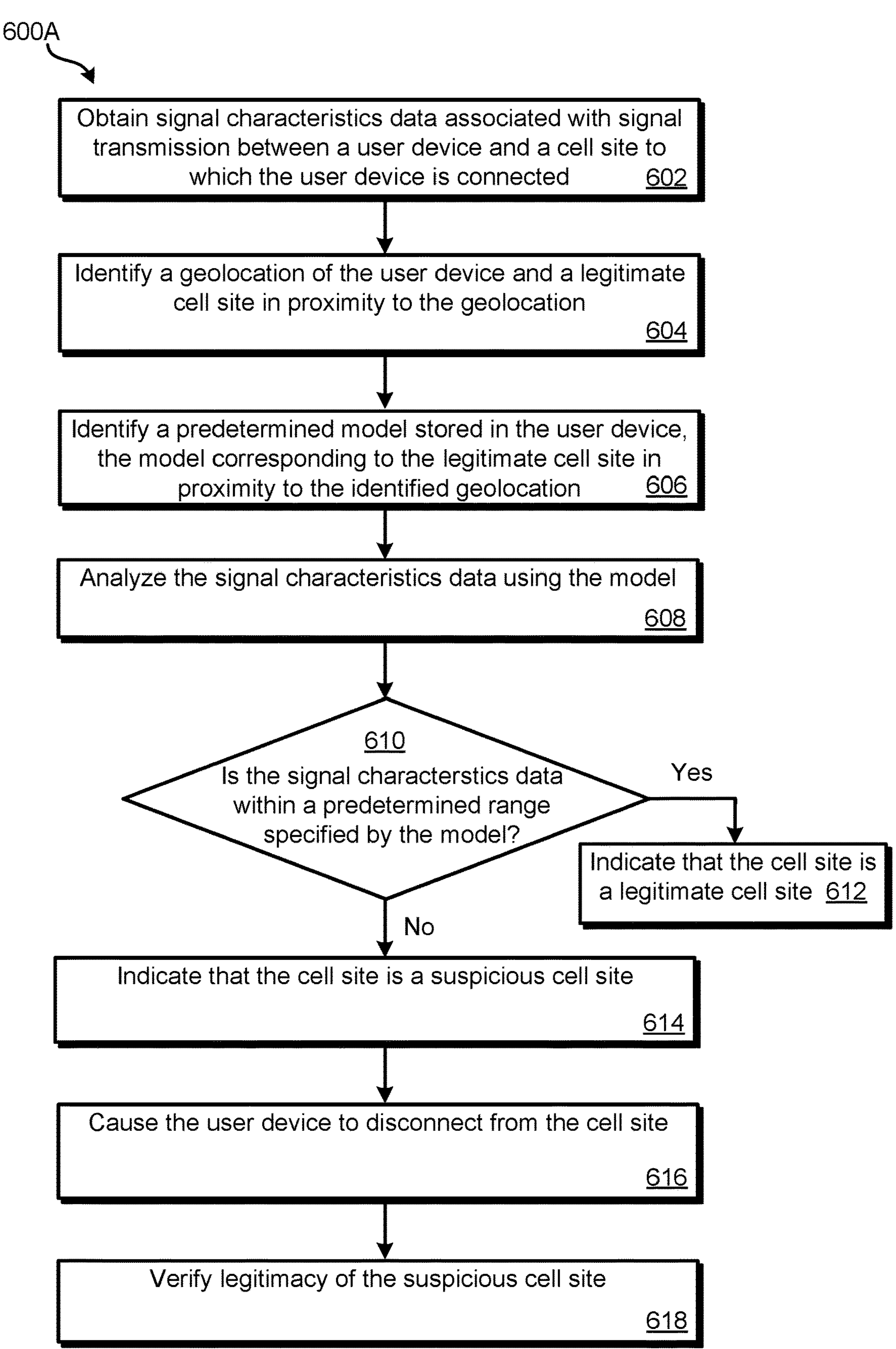
FIG. 6A is a flow diagram illustrating an example method for determining a cell site simulator, according to various embodiments.

FIG. 6A is a flow diagram illustrating an example method 600A for determining a cell site simulator, according to various embodiments. Method 600A may be performed by system 100, 200A, 200B, 300, or any components thereof such as the user device 102, as described above. Depending on the implementation, method 600A may include additional, fewer, or alternative steps/operations performed in various orders or in parallel. Method 600A or any operations thereof may be combined with other methods or processes described herein in any suitable manner.

At 602, signal characteristics data is obtained in a user device. A connection is initiated established by the user device with a cell site. Signal transmission is initiated between the user device and the cell site. The signal transmission may comprise uplink signal transmission and downlink signal transmission. The signal characteristics data may be generated by analyzing the signals transmitted between the user device and the cell site in a specific time window (e.g., from the time point when the initial connection between the user device and the cell site for a predetermined time duration). The signals may be analyzed by the user device. In some embodiments, analysis of signals may be triggered and automatically performed once the initial connection is established.

As mentioned above, the signal characteristics data is associated with signal transmission and can be further labeled with a cell site ID of the cell site, a timestamp, and a signal type (e.g., downlink or uplink). In some embodiments, the signal characteristics data includes geolocation data of the user device, frequency data, signal strength data, S/N ratio data, among others, for the specific time period.

At 604, a geolocation of the user device is identified, by the user device, based on the geolocation data included in the signal characteristics data. In some embodiments, when the user device is moving, a geographic area within which the user device is moving may be identified. A legitimate cell site in proximity to the identified geolocation of the user device or within the identified geographic area is identified. In some embodiments, multiple legitimate cell sites may be identified in proximity to the identified geolocation of the user device or within the identified geographic area.

At 606, a predetermined model stored in the user device is identified. A plurality of predetermined models may be stored in the memory of the user device, and each model corresponds to a known legitimate cell site. The model may be generated by a security management system and sent to the user device, as described above. The model may be constructed/developed based on historical signal characteristics data associated with signal transmissions between the user device and a specific legitimate cell site, as described above. The model corresponding to the identified legitimate cell site is identified and selected by the user device. In some embodiments, multiple models respectively corresponding to the multiple legitimate cell sites identified at 604 may be selected.

At 608, the signal characteristics data is analyzed by the user device using the identified model. Various predetermined algorithms included in the model may be employed to analyze the signal characteristics data and extract one or more actual (observed) features or attributes from the signal characteristics data. The actual features or attributes could include signal characteristics such as cell site ID, SIB, signal strength, frequency, S/N ratio, their correlations, and any other characteristics of the signals transmitted between the user device and the cell site to which the user device is connected.

At 610, a determination is made on whether the signal characteristics data is within a predetermined acceptable range specified by the selected model. In some embodiments, the extracted features or attributes at 608 may be compared with expected features associated with the legitimate cell site provided by the model to determine a matching degree of the expected features and the expected features. In some embodiments, a determination is made on whether the signal characteristics data is within a predetermined acceptable range, based on the matching degree. For example, the selected model contains information about the expected features or attributes for the identified legitimate cell site. These expected features are derived from historical signal characteristics data associated with legitimate cell site. For example, the model may specify that the signal strength should fall within a certain range, the S/N ratio should be above a certain threshold, and other relevant signal characteristics should have specific characteristics. The extracted features from the actual signal characteristics data are compared with these expected features stored in the model. The comparison can include assessing whether the observed signal strength, S/N ratio, and other relevant characteristics are consistent with what is expected for a legitimate cell site. The matching degree of the actual features against the expected features as well as the predetermined acceptable range, as specified by the model, quantitatively or semi-quantitatively define the tolerance levels for each feature or attribute. The acceptable range more accurately and precisely defines a range within which the observed features are considered acceptable and indicative of a legitimate cell site. These acceptable ranges are part of the specifications of the selected model. If the observed features fall within the predetermined acceptable range (i.e., a degree of matching of the observed features against the expected features is within a predetermined threshold level or a specified tolerance level), it is indicated that the signal characteristics data is consistent with the behavior of a legitimate cell site, and the cell site is considered legitimate.

In some embodiments, if more than one models are selected, the signal characteristics data may be analyzed separately using the selected models to determine whether the signal characteristics data fall within an acceptable range for each one of the selected models.

In some embodiments, the selected model comprises a machine learning model as described above. The machine learning model may be trained and validated by the security management system and sent to the user device.

At 612, in response to the determination that the signal characteristics data is within the predetermined acceptable range specified by the model, an indication is made that the cell site is a legitimate cell site.

At 614, in response to the determination that the signal characteristics data is not within the predetermined acceptable range specified by the model, an indication is made that the cell site is a suspicious cell site.

At 616, a protective action is taken by the user device to cause a disconnection from the suspicious cell site. Data transmission between the user device and the suspicious cell site is ceased.

At 618, a verification process is performed to verify the legitimacy of the suspicious cell site. In some embodiments, a challenge-response application is activated by the user device to verify the suspicious cell site, as described above. In some embodiments, a private-public key pair mechanism is employed to verify the suspicious cell site, as described above.

Figure 6B:
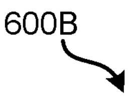
FIG. 6B is a flow diagram illustrating an example method for detecting and locating a cell site simulator, according to various embodiments.
Figure 6B:
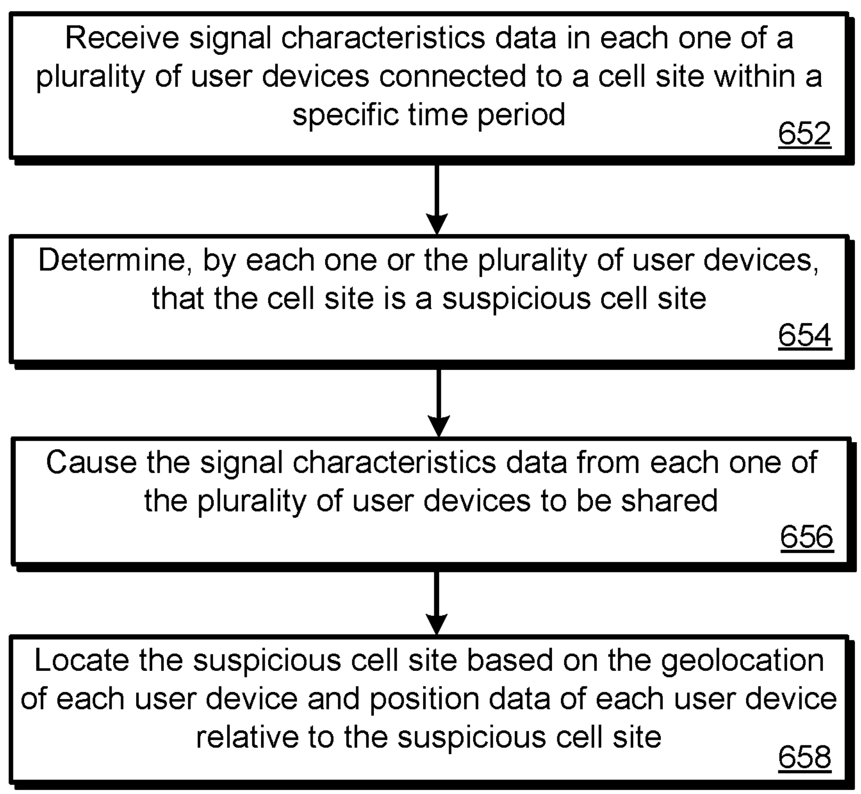

FIG. 6B is a flow diagram illustrating an example method 600B for detecting and locating a cell site simulator, according to various embodiments. Method 600B may be performed by system 300 or any components thereof such as the user device 102 and the security management system 106, as described above. Depending on the implementation, method 600B may include additional, fewer, or alternative steps/operations performed in various orders or in parallel. Method 600B or any operations thereof may be combined with other methods or processes described herein in any suitable manner.

At 652, signal characteristics data associated with signals transmitted between each one of a plurality of user devices and a cell site in a specific time window is received in the corresponding user device. The plurality of user devices may be connected to the same cell site within the specific time window. Each one of the plurality of user devices may initiate a connection with the cell site for transmitting and receiving signals through the connection within the specific time window. The signal characteristics data may include the geolocation data indicating the geolocation of each user device as well as the position data indicating a position of the user device relative to the cell site (e.g., angles).

At 654, the cell site is determined as a suspicious cell site by at least two of the plurality of user devices, based on a predetermined model stored in each one of the plurality of user devices. The models corresponding to the plurality of user devices may be different from each other and user device-specific. For example, the suspicious cell site may be identified, determined, and/or verified by the first user device using a first model selected from a first plurality of models stored in the memory of the first user device. Similarly, the same suspicious cell site may be identified, determined, and/or verified by the second user device using a second model selected from a second plurality of models stored in the memory of the second user device, and so forth. In some embodiments, the cell site is determined as a suspicious cell site by at least three user devices of the plurality of user devices. Determination of the suspicious cell site may be performed by one or more steps of method 600A or other processes described in the present disclosure.

At 656, the signal characteristics data from each one the plurality of user devices is shared. In some embodiments, the signal characteristics data from each one the plurality of user devices may be transmitted to the security management system or a central server.

At 658, the suspicious cell site is located based on the geolocation data and position data included in the signal characteristics data associated with each user device. In some embodiments, a location of the suspicious cell site or a geographic area where in the suspicious cell site is located is determined by using a triangulation-based technique. The location of the suspicious cell site may be reported to a third party such as law enforcement.

Figure 7:
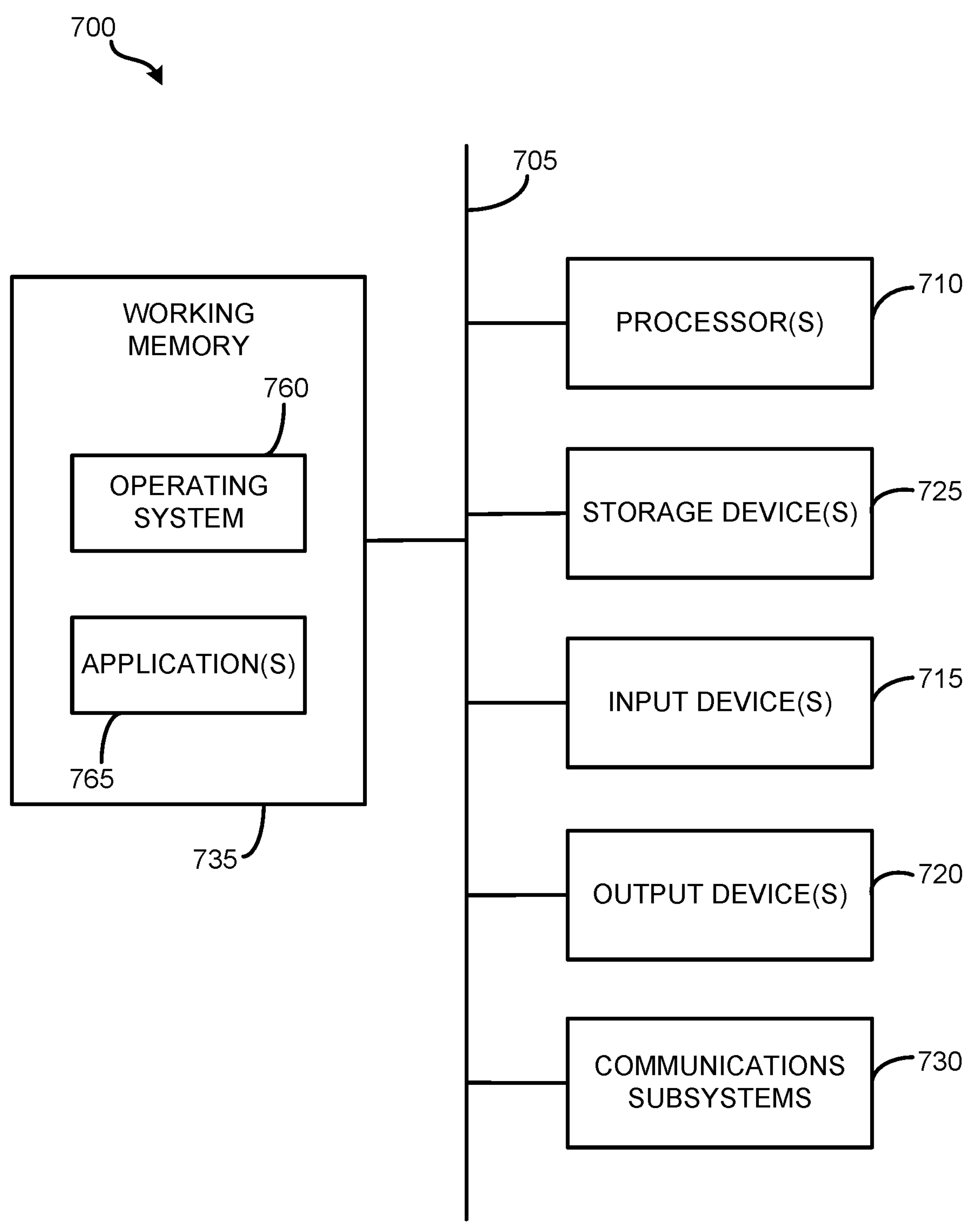
FIG. 7 is a schematic diagram illustrating an example computer system or computer device, according to various embodiments.

The communications systems 100, 200A, 200B, 300, and any components included therein such as the user device 102 and the security management system 106 as described above may include a computer system that further includes computer hardware and software that form special-purpose network circuitry to implement various embodiments such as communication, model construction, optimization, calculation, determination, and so on. FIG. 7 is a schematic diagram illustrating an example of computer system 700. The computer system 700 is a simplified computer system that can be used to implement various embodiments described and illustrated herein. A computer system 700 as illustrated in FIG. 7 may be incorporated into devices such as a portable electronic device, mobile phone, server grade machines, or other device as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner. The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.)

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/ code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms “a”, “an”, and “the” include plural references unless the context clearly dictates otherwise. Thus, for example, reference to “a data point” may include a plurality of such data points, and reference to “the processor” includes reference to one or more processors and equivalents thereof known in the art, and so forth.

Also, the words “comprise”, “comprising”, “contains”, “containing”, “include”, “including”, and “includes”, when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method comprising:

obtaining signal characteristics data in a user device, the signal characteristics data associated with signals transmitted between the user device and a cell site connected to the user device within a time period and comprising geolocation data indicating a geolocation of the user device within the time period, wherein the signal characteristics data further comprises a cell site identifier (ID) of the cell site;

identifying, by the user device, a legitimate cell site in proximity to the geolocation of the user device, based on the geolocation data, wherein the cell site ID of the cell site is the same as a cell site ID of the identified legitimate cell site;

identifying, by the user device, a model stored in the user device, the model corresponding to the identified legitimate cell site and comprising one or more predetermined expected features extracted from historical signal characteristics data associated with signals transmitted between the user device and the identified legitimate cell site;

selecting, by the user device, the identified model, by the user device;

extracting, by the user device, one or more actual features from the signal characteristics data using the selected model;

comparing, by the user device, the actual features with the predetermined expected features to determine a degree of matching of the actual features with the predetermined expected features; and in response to a determination that the degree of matching is below a predetermined threshold, indicating, by the user device, that the cell site is a suspicious cell site;

in response to a determination that the degree of matching is below a predetermined threshold, automatically sending a challenge question to the suspicious cell site to request a response, the challenge question being selected from a pair of challenge question and answer preestablished between the user device and the legitimate cell site; and in response to a determination that the suspicious cell site fails to provide a response containing an answer that matches the answer to the challenge question, verifying that the suspicious cell site is a cell site simulator.

2. The method of claim 1, further comprising:

in response to a determination that the degree of matching is below a predetermined threshold, automatically causing the user device to disconnect from the cell site.

3. The method of claim 1, wherein the signal characteristics data further comprises a plurality of data points, wherein each data point is a signal measure selected from signal frequency, signal strength, signal-to-noise ratio, and signal information block (SIB), and each data point is labeled with a signal type selected from an uplink signal and a downlink signal, and each data points is labeled with a timestamp.

4. The method of claim 3, wherein the actual feature extracted from the signal characteristics data represent an actual degree of variability of the signal measure over time within the time period, and the predetermined expected feature extracted from the historical signal characteristics data represent a predetermined expected degree of variability of the signal measure over time within the time period.

5. The method of claim 3, wherein the actual feature extracted from the signal characteristics data represent an actual correlation between two signal measures over time within the time period, and the predetermined expected feature extracted from the historical signal characteristics data represent a predetermined expected correlation between two signal measures over time within the time period.

6. The method of claim 1, wherein the model is selected from a plurality of models stored in the user device, each one of the plurality of models corresponds to a legitimate cell site of a plurality of cell sites comprising the identified legitimate cell site, and each one of the plurality of models comprises one or more predetermined expected features extracted from historical signal characteristics data associated with signals transmitted between the user device and the corresponding legitimate cell site, and the plurality of models are different with respect to the predetermined expected features.

7. The method of claim 1, wherein the model is a machine learning model trained and validated with the historical signal characteristics data.

8. The method of claim 1, further comprising:

receiving the model in the user device from a security management system.

9. A user device comprising:

one or more processors; and a computer-readable storage media storing computer-executable instructions that, when executed by the one or more processors, cause the user device to:

obtain signal characteristics data, the signal characteristics data associated with signals transmitted between a user device and a cell site connected to the user device within a time period and comprising geolocation data indicating a geolocation of the user device within the time period wherein the signal characteristics data further comprises a cell site identifier (ID) of the cell site;

identify a legitimate cell site in proximity to the geolocation of the user device, based on the geolocation data, wherein the cell site ID of the cell site is the same as a cell site ID of the identified legitimate cell site;

identify a model stored in the user device, the model corresponding to the identified legitimate cell site and comprising one or more predetermined expected features extracted from historical signal characteristics data associated with signals transmitted between the user device and the identified legitimate cell site;

select, by the user device, the identified model;

extract, by the user device, one or more actual features from the signal characteristics data using the selected model;

compare the actual features with the predetermined expected features to determine a degree of matching of the actual features with the predetermined expected features; and in response to a determination that the degree of matching is below a predetermined threshold, indicate that the cell site is a suspicious cell site;

in response to a determination that the degree of matching is below a predetermined threshold, automatically send a challenge question to the suspicious cell site to request a response, the challenge question being selected from a pair of challenge question and answer preestablished between the user device and the legitimate cell site; and in response to a determination that the suspicious cell site fails to provide a response containing an answer that matches the answer to the challenge question, verify that the suspicious cell site is a cell site simulator.

10. The user device of claim 9, wherein the instructions, when executed by the one or more processors, further cause the user device to:

in response to a determination that the degree of matching is below a predetermined threshold, automatically cause the user device to disconnect from the cell site.

11. The user device of claim 9, wherein the signal characteristics data further comprises a plurality of data points, wherein each data point is a signal measure selected from signal frequency, signal strength, signal-to-noise ratio, and signal information block (SIB), and each data point is labeled with a signal type selected from an uplink signal and a downlink signal, and each data points is labeled with a timestamp.

12. The user device of claim 11, wherein the actual feature extracted from the signal characteristics data represent an actual degree of variability of the signal measure over time within the time period, and the predetermined expected feature extracted from the historical signal characteristics data represent a predetermined expected degree of variability of the signal measure over time within the time period.

13. The user device of claim 11, wherein the actual feature extracted from the signal characteristics data represent an actual correlation between two signal measures over time within the time period, and the predetermined expected feature extracted from the historical signal characteristics data represent a predetermined expected correlation between two signal measures over time within the time period.

14. The user device of claim 9, wherein the model is selected from a plurality of models stored in the user device, each one of the plurality of models corresponds to a legitimate cell site of a plurality of cell sites comprising the identified legitimate cell site, and each one of the plurality of models comprises one or more predetermined expected features extracted from historical signal characteristics data associated with signals transmitted between the user device and the corresponding legitimate cell site, and the plurality of models are different with respect to the predetermined expected features.

15. The user device of claim 9, wherein the model is a machine learning model trained and validated with the historical signal characteristics data.

16. The user device of claim 9, wherein the instructions, when executed by the one or more processors, further cause the user device to:

receive the model from a security management system.

* * * * *